(12) United States Patent
Murthy et al.

(10) Patent No.: US 7,000,118 B1
(45) Date of Patent: Feb. 14, 2006

(54) ASYMMETRIC SYSTEM AND METHOD FOR TAMPER-PROOF STORAGE OF AN AUDIT TRIAL FOR A DATABASE

(75) Inventors: Madhusudhana H.S. Murthy, Bangalore (IN); Aridaman Tripathi, Mussoorie (IN)

(73) Assignee: Novell, Inc., Provo, UT (US)

( * ) Notice: Subject to any disclaimer, the term of this patent is extended or adjusted under 35 U.S.C. 154(b) by 831 days.

(21) Appl. No.: 09/690,110

(22) Filed: Oct. 16, 2000

Related U.S. Application Data

(63) Continuation-in-part of application No. 09/634,445, filed on Aug. 8, 2000, now Pat. No. 6,968,456.

(51) Int. Cl.
*H04L 9/00* (2006.01)
*G06F 17/30* (2006.01)
*G06F 7/00* (2006.01)

(52) U.S. Cl. .......................................... 713/185; 707/8
(58) Field of Classification Search ................ 713/185; 707/8
See application file for complete search history.

(56) References Cited

U.S. PATENT DOCUMENTS

| 5,661,803 A | * | 8/1997 | Cordery et al. ............... 705/60 |
| 5,995,624 A | | 11/1999 | Fielder et al. |
| 6,122,630 A | * | 9/2000 | Strickler et al. ............... 707/8 |

* cited by examiner

*Primary Examiner*—Gilberto Barrón, Jr.
*Assistant Examiner*—G. Gurshman
(74) *Attorney, Agent, or Firm*—Haynes and Boone, LLP

(57) ABSTRACT

An asymmetric key based method and system is provided for a tamper-proof storage of one or more records of an audit trail for a database. The asymmetric key based key exchange mechanism is employed to arrive at a common key, which is then used to obtain the authentication and the validation tokens. The method creates one or more authentication token values, and generates one or more validation token values from the authentication token values through a combination of a hashing process and an encryption process. Once the validation token values are created, they are further integrated into the records in the database. When an authorized person such as an auditor who needs to check the integrity of the records, he can detect a tampering of the records by comparing a validation token value newly computed by him independently with the validation token value integrated in the record.

21 Claims, 2 Drawing Sheets

ASYMMETRIC SYSTEM AND METHOD FOR TAMPER-PROOF STORAGE OF AN AUDIT TRIAL FOR A DATABASE

CROSS REFERENCE

The application is a Continuation-in-Part application of the U.S. patent application Ser. No. 09/634,445, which was filed on Aug. 8, 2000, now U.S. Pat. No. 6,968,456 entitled "Method and System for Providing a Tamper-Proof Storage in an Audit Trail in a Database."

BACKGROUND OF THE INVENTION

The present invention relates generally to computer software, and more particularly, to a system and method for storing data in a tamper proof storage.

In today's computer network environment, large volumes of data are customarily stored and used by various software applications. Data management has become an essential task for many data intensive industries. A smooth business operation depends both on the efficiency and security of the use of the stored data. From the perspective of data management, a database administrator (DBA) is powerful in that he usually has full access to the entire database and all contents stored therein. He can read, write and modify any data stored in the database. In a normal situation, the DBA is endowed with the highest level of trust because of his enormous responsibility. In certain cases, it is desirable to store data in a database in a secure way such that even a privileged user like the DBA should not be able to modify records without detection. For example, it is very important to protect a monotonically increased audit trail which records actions taken by a user along with his identity against modifications. No one should be able to modify this trail, thus an independent auditor can trace any user's, even the DBA's, actions relating to the database, whereby the integrity and the security of the database are greatly enhanced.

The normal practice consists of reading audit trail data in a database directly through SQL, JDBC or any such standard client program. Several conventional methods are used for protecting the integrity of the audit trail in a database system. For example, the entire audit trail can be encrypted. Although this encryption prevents access to the trail by the DBA, it does not prevent him from deleting certain records without being detected. Also it hinders the normal practice of reading the trail by users of the database.

As an alternative solution, the audit trail can be validated by a signing process. The signing process corresponds to a digital signature operation which is well known in the industry. This signing process for generating a signature involves taking a message of any length, forming an "imprint" of the message to a fixed length by hashing, and mathematically transforming the hash using cryptographic techniques. While the signature can be generated only by the signer, any other user can verify the generated signature. If a trail for which the signature is attached has been tampered with, the verifier cannot successfully validate the digital signature. The signing process is directed to the entire trail, not a specific record in it. Under a typical scenario, after all the existing records have been collated, a signature is then generated for the entire trail, and the resulting signature is put in a secure place. Therefore, every time a new record is added to the database, the audit trail is signed again. This method has a heavy processing and computational overhead as the entire audit trail needs to be accessed and signed every time a record is added.

In another alternative solution, the records can be validated by requiring a signature of each record. This method validates the individual records but still fails to prevent the DBA from deleting records without detection.

The process of auditing a database audit trail is expected to conform to "four eyes principle." This means that there can be two or more auditors who separately and independently track a database audit trail. The audit trail starts with the joint participation of all the auditors. The auditors are supposed to maintain a "non-trusting" attitude towards each other and strictly track the audit trail for database integrity. All solutions to tamper-proof storage discussed in the above paragraphs are presented in the single auditor framework and hence cannot be applicable to auditing process that requires "four eyes principle."

What is needed is an efficient method and system for supporting a secure database system so that any modifications of the audit trail in a database system by any user, including the privileged user like the DBA, would be detectable. The proposed method and system should also support "four eyes principle" for auditing.

SUMMARY OF THE INVENTION

A method and system is provided for a tamper-proof storage of an audit trail in a database having one or more records. Since the integrity of the audit trail may be vulnerable to actions taken by an access-privileged user such as a database administrator, a mechanism is provided for authorized persons such as one or more auditors to efficiently detect any changes made by the user to the records in the audit trail.

In one example of the present invention, an audit trail has one or more records, each record having a corresponding authentication token and a validation token. If there are two or more auditors, then the trail record will have separate validation tokens for each of the auditors. The database has a writing machine (writer) which is not under the control of the access-privileged users or the auditors.

The audit trail is initiated by generating an initial value of the authentication token and an initial value of the validation token based on a first encryption key generated by the writer (writer public key) and a second encryption key generated by the auditor (auditor public key). In a case of two or more auditors, separate validation tokens are generated for each auditor based on his public key. Complimentary to the writer public key and the auditor public key, a third encryption key (writer private key) related to the first encryption key and a fourth encryption key (auditor private key) related to the second encryption key are also created. While integrating the values of the validation token(s) and the writer public key into each corresponding record of the audit trail, the values of the authentication token, and the writer public key are constantly updated for the next record. The writer has an access to the auditor public key, and the auditor has an access to the writer public key. However, only the writer has an access to the writer private key, and only the auditor has an access to the auditor private key. Each auditor has the ability to compute the values of the validation token for the records to verify against the integrated values of the validation token in order to detect a tampering of the audit trail by any access-privileged user.

Various benefits are achieved over conventional approaches. For instance, the security of the entire trail in a database is strengthened, while normal database queries are not hindered. Further, any actions taken against the records in the trail can be detected without involving a computationally expensive process. Additionally the auditing process satisfies the requirements of a "four eyes principle."

DESCRIPTION OF THE PREFERRED EMBODIMENT

While it is not an objective of the present invention to prevent the database administrator (DBA) from accessing the database under his control or hinder his daily work in any way, the present invention intends to provide a security system for improving the reliability of the audit trail in a database by assuring that any modification or deletion of the records in the trail can be detected by an independent auditor.

Figure 1:
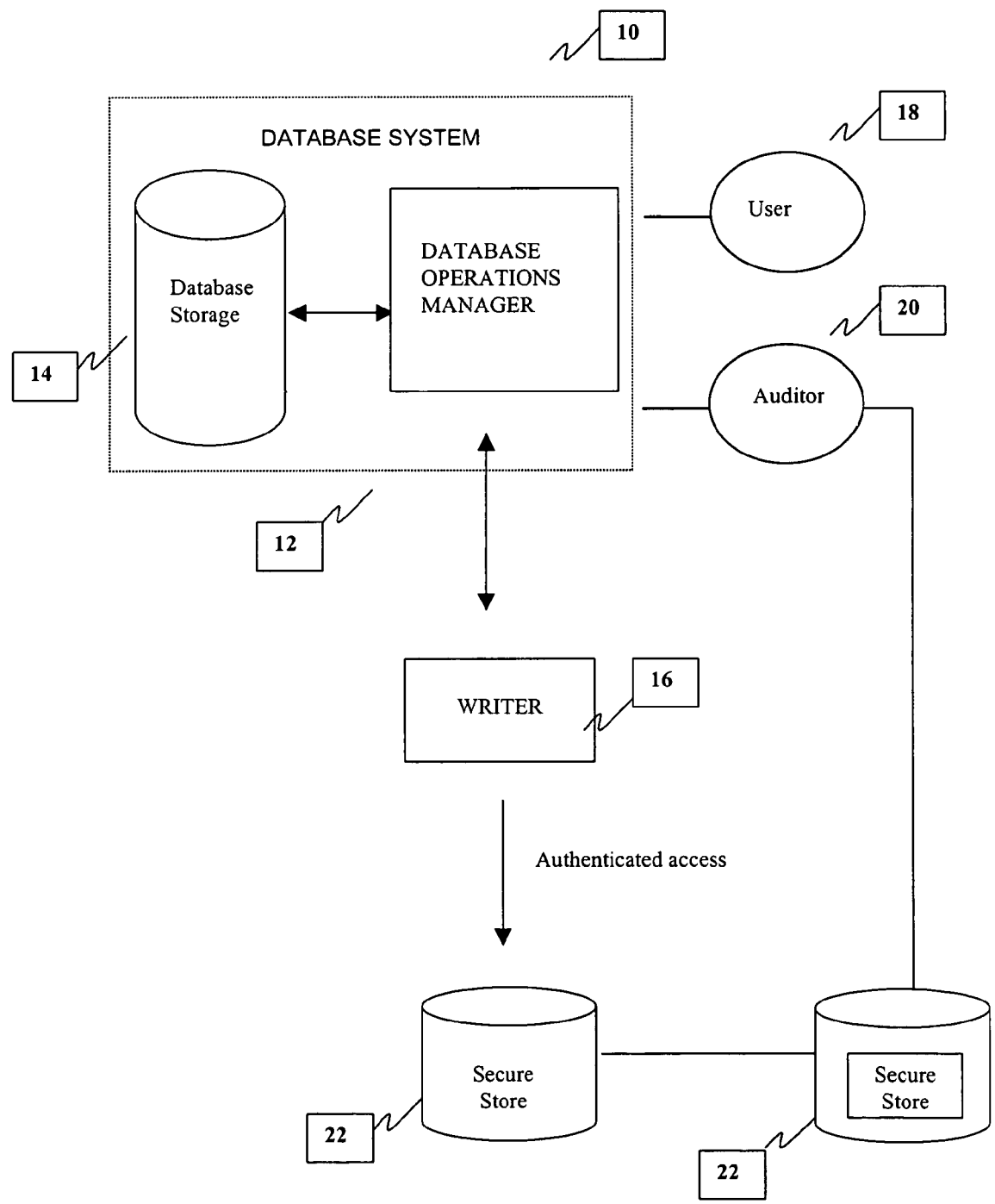
FIG. 1 illustrates a simplified graphical representation of a tamper proof database system.

Referring now to FIG. 1, a simplified tamper proof database system (DB) 10 is shown. The DB 10 contains a main database operations manager (DBOM) 12 and database storage 14. The Secure Store (SS) 22 stores secured information and performs access control based on a user's identity. The SS 22 is essentially a database containing information about network users, network devices, and other resources of a network. It helps to manage users, the network resources, and information on the network by providing an administrator/operation manager which has a precise view of network resources and services at any instant of the network operation. In some examples of the present invention, the SS 22 can be a software module, a hardware component, or a combination of both software and hardware components. The SS 22 is also a secured information storage for storing sensitive information in a confidential form. The SS 22 stores information for all entities in a computer network environment, the entities being users, computer hardware devices, or software modules, etc. Every entity is entitled to an exclusive access to a partitioned area in the SS 22. For example, an auditor 20 is only given access to his related part of the SS 22 if he is authenticated by password or through other authentication methods. The SS 22 then provides information, applications, and communications accesses to the user after a successful authentication process. Connected to or contained in the DBOM 12 is a software engine or server that writes data to the database storage 14 or the SS 22. It is heretofore referred to as a writing machine or a writer 16. The writer 16 is decoupled from the DB 10 and is not under the control of the DBA. The entire DB 10 interacts with users such as a user 18 and the auditor 20 based on predetermined access conditions. A typical database system such as one provided by Oracle Corporation can be used as the DB 10 in the present invention. In some cases, the SS 22 can be a Novell Directory Services system (NDS) or the Secret Store System in NDS. The writer 16 can be a network loadable module (NLM) running on a software platform such as Novell's NetWare. The network loadable modules are program modules that perform specific tasks. For example, specific program modules can be written to implement the functionality of a writer.

In order to implement various examples of the present invention, one common process involved is an encryption process. This process is to encrypt a plain readable message through mathematical transformation so that it is no longer readily decipherable. The transformed message after the encryption process is usually referred to as a ciphered message. The receiver performs reverse transformation on the ciphered message to obtain the original plain message. The forward and reverse transformation encryption transformations require a shared secret key. The sharing of a secret key is facilitated using a public private key pair. The sender encrypts the shared secret key using the receiver's public key and sends the ciphered message to the receiver. The receiver decrypts the shared secret key using his private key. Only the intended receiver can decrypt properly and get the shared secret key, as he is the only one with the knowledge of his private key. Since the sender and the receiver use different keys for encryption and decryption of the same data, this scheme is also called as an asymmetric key scheme.

The writer and the auditor can use a public key cryptographic technique, for example, Diffie-Hellman key exchange technique, to arrive at a shared key which can then be used to compute authentication and validation tokens. In a Diffie-Hellman (D-H) scheme, each of the participants generates a private and public key pair. Only the public key of the public-private key pair is made public. Though the private and public key are mathematically related, obtaining the private key from the knowledge of the corresponding public key is computationally infeasible. This problem is well known as the discrete logarithm problem. By choosing the length of the key pair appropriately, efforts to break the discrete logarithm problem can be made as high as desired. The participants involved in a D-H scheme exchange their public keys. Then they perform exponentiation of the obtained public key which could be used further for encryption purposes. In order to facilitate proper mathematical operations, an appropriate (large enough so that discrete log problem is infeasible) prime number field is chosen. The modulus of the number field is denoted by P and the operations supported are modular additional and modular multiplication. The number field has P-1 nonzero elements and $\alpha$ is denoted as the generating base which generates all the nonzero elements of the number field as 1, $\alpha^1 (\mod P)$, $\alpha^2 (\mod P), \ldots, \alpha^{P-1} (\mod P)$. If a private key is chosen as W, then the corresponding public key is $\alpha^W (\mod P)$. For the sake of notational convenience, the public key is written as $\alpha^W$. All computations are assumed to be performed modulo P unless otherwise specified.

Hence, the security of the shared secret key exchange algorithm is primarily measured by the design of the public and private keys, and most likely in the digit length of these keys. By increasing the key length, the difficulty level to break the encryption algorithm is increased, and the ciphered message is more secure in transmission.

Another common process used by various examples of the present invention is called a hashing process (or a "hash" in short). A hash is a process of transforming a message of any length into an output message with a fixed length. The output message is called a digest. By definition, a hashing process maps a message of arbitrary length into a digest of a predetermined length. A secure hashing algorithm is designed so that it is computationally unfeasible to determine an input message from its corresponding output digests. Although there are a significant number of hashing algorithms known in the art, some well-known hashing algorithms are MD4, MD5, and Secure Hashing Algorithm (SHA).

For the purpose of explaining examples of the present invention, some other technical terms are defined summarily below:

$A_i$—$i_{th}$ Authentication token.

$R_i$—$i_{th}$ Record.

$D_i$—String formed by concatenating fields of the $i_{th}$ Record or referred to as the data section of the $i_{th}$ Record.

$V_i$—Auditor Validation token for the $i_{th}$ Record.

$H(x)$—A secure hash of the string x.

$E_k\{x\}$—Encrypt x with key k.

X+Y—Concatenation of strings X and Y.

P—Prime Number for Exponentiation Operation.

α—The generator of Prime Number Field.

AUD—auditor private key.

$\alpha^{AUD}$(mod P)—Auditor Public Key.

Wi—i-th writer private key $\alpha^{Wi}$ i-th writer public key

In one example of the present invention, an audit trail is carefully created and maintained. In essence, the audit trail is a database system log used for security purposes. The audit trail is normally used for keeping track of operations applied to the database system in general, along with user identities. Since a user is granted access to the database after an authentication process, the identity of the user is known to the database, the audit trail thus can record "who has done what" to the database.

The audit trail also includes values of a validation token relying on which any tampering of the audit trail may be detected. In general, a validation token is a field in a record of the audit trail. When an original record is initially stored to create the audit trail, it is written along with an initial value of the validation token. As it will be discussed later in more detail, in one example of the present invention, a mathematical representation for an algorithm to generate the validation token can be represented by the following equations:

$$V_i = H(V_{i-1} + E_{Ai}\{D_i\}),$$

wherein $A_i$ is referred to as a value of an authentication token. Hence, the key to the encryption process for generating a validation token is its related authentication token. A series of authentication token values can be generated by employing an encryption key exchange technique between the writer and an auditor. For instance, for the $i^{th}$ record (e.g., $R_i$), the writer generates a writer private key called Wi, computes and stores a writer public key $\alpha^{Wi}$. The auditor also generates an auditor private key AUD and an auditor public key $\alpha^{AUD}$. After the auditor sends the auditor public key to the writer and the writer performs an exponentiation with $\alpha^{AUD}$ as the base and the writer private key Wi as the exponent. This operation is represented as $$Ti = (\alpha^{AUD * Wi \bmod P-1})(\bmod P)$$

where P is a prime number, (mod P) denotes modulo P operation and Ti is the intermediate result. The writer then computes the corresponding authentication token according to the following process formula:

$$A_i = H(Ti(\bmod P))$$

where H denotes a one-way hash function. Using this authentication token to processes the data $D_i$ in accordance with the method explained above, the validation token $V_i$ is then generated. It is clear that the computation of $i^{th}$ validation token $V_i$ by the writer requires, among others, the knowledge of writer private key Wi and auditor public key $\alpha^{AUD}$.

With the validation tokens created for the audit trail of the database, both $V_i$ and $D_i$ are stored in the DB 10 as part of $R_i$.

Table 1 below shows different sections/fields of the database according to one example of the present invention.

TABLE 1

| Data Sector for the Record | Writer-Public Key | Validation Token for Auditor A | Validation Token for Auditor B |
|---|---|---|---|
| $D_0$ | $\alpha^{W0}$ | $V_0$ | $U_0$ |
| $D_1$ | $\alpha^{W1}$ | $V_1$ | $U_1$ |
| . | . | . | . |
| . | . | . | . |
| . | . | . | . |
| $D_n$ | $\alpha^{Wn}$ | $V_n$ | $U_n$ |

There are generally three major sections, the section labeled as Data Sector of the Record contains the actual database record field, the Writer Public Key section includes a writer public key computed by the writer for the corresponding records, and the Validation Token section shows the validation token values written by the writer and verifiable by the auditors such as Auditor A and B.

To start an auditing process, an auditor trail needs to be initialized. According to one example the present invention, both the writer and the auditors are required to participate in the process. For starting the audit trail, the writer generates a first writer private key $W_0$ and the corresponding writer public key $\alpha^{W0}$, and transmits $\alpha^{W0}$ to all the auditors. Each auditor also generates his private key AUDn and the corresponding public key $\alpha^{AUDn}$. The auditor sends his respective auditor public key to the writer and the other auditors. The auditors together generate a common initialization key, $\alpha^{INIT-AUD-COM}$ and $ID_{aud}$, the common name or identification for the audit trail. The common initialization key can be computed either using Group Diffie-Hellman techniques or having each auditor send a pseudo random number (PRN) to other auditors using public key encryption and the common key is generated by combining the PRNs of all the auditors. Each auditor computes a temporary parameter X by concatenating an audit trail identity $ID_{aud}$, a writer public key $\alpha^{W0}$, the common initialization key $\alpha^{INIT-AUD-COM}$ and the auditor's public key $\alpha^{AUDn}$ or mathematically:

$$X = ID_{aud} + \alpha^{W0} + \alpha^{AUDn} + \alpha^{INIT-AUD-COM}$$

if there are more than one auditor, then all auditor public keys are appended in the above formula to appear as:

$$X = ID_{aud} + \alpha^{W0} + \alpha^{INIT-AUD-COM1} + \alpha^{AUD1} + \ldots + \alpha^{AUDn}.$$

With the value X, the auditor with the public key $\alpha^{AUDi}$ then forms $D_0$ by running a hash function over X (i.e., $D_0 = $ Hash (X)). Thereafter, the initial value of the authentication token is created as $A_0 = H(\alpha^{AUDi * W0})$. With the initial value of the authentication token $A_0$ and $D_0$, the initial value of the validation token can be generated as:

$$V_0 = H(A_0 + E_{A0}\{D_0\}).$$

The first record $R_0$ then stores $\alpha^{W0}$ and $V_0$ as shown in Table 1. The auditor private key AUDi, the $ID_{aud}$, $\alpha^{INIT-AUD-COM}$, and $D_0$ are further stored in the designated SS 22 for the auditor. For audit purposes, there are two designated fields added to the Database. One for storing the writer public key $\alpha^{Wi}$, and the other for holding the validation token value $V_i$. If there is another auditor, say B, the computational steps shown above are repeated with his audit public key. There will be one more field in the database to hold the validation token $U_i$ for the auditor B.

When writing more entries to the audit trail, the writer private keys and validation token values are generated step by step in a "chaining" fashion. First, the values of $\alpha^{Wi}$ (mod P) and $\alpha^{AUDi*Wi}$ (mod P) are calculated by raising $\alpha$ and $\alpha^{AUDi}$ to the exponent Wi, so that the authentication token value for a record can be computed as:

$$A_i = H(\alpha^{AUDi*Wi \ (mod \ P-1)} \ (mod \ P)).$$

With the authentication token $A_i$ in hand, the validation token is computed as:

$$V_i = H \ (V_{i-1} + E_{Ai}\{D_i\})$$

wherein $A_i$ is the encryption key for i-th auditor. If there are "n" auditors, the encryption keys are respectively $A_1, A_2, \ldots A_n$. Finally, the writer private key is updated as:

$$W_{i+1} = H(W_i + A_1 + A_2 + \ldots + A_n).$$

The authentication keys $A_i$'s are immediately deleted after their usage in generating the new writer private key $W_{i+1}$. The computed $\alpha^{Wi}$ and $V_i$ are stored as part of the record $R_i$ of the database. $W_{i+1}$ is stored in the designated SS 22 for the writer to irreversibly replace the previous value $W_i$. For the writer private keys, only the writer has a full access (e.g., read and write rights).

For a validation process, the verification of validation token requires the knowledge of both the auditor private key and the writer public key $\alpha^{Wi}$. The auditor private key and $D_0$ are extracted from the SS 22 of the auditor using his own access privileges. The audit trail is then validated from the first record downwards. For every record, both the authentication token and the validation token values are computed using the algorithm described above and the computed validation token is compared with the validation token stored in the audit trail. Any mismatch between them indicates a tampering of the trail.

As the writer and the auditor use asymmetric key based computations to perform, respectively, writing and validating operations, the audit trail thus implemented is referred to as an asymmetric audit trail.

The audit trail thus created is tamper-proof. An attacker would have to solve discrete logarithm problem to know the writer private keys from the writer public keys. Further, the auditor's public key is stored in writer's SS, which is secure from unauthorized accesses. The validation token value computation requires the previous validation token as a parameter and hence a chaining effect in terms of generating the validation token values (or a "hash chaining effect") is ensured.

As it is known, an audit trail can usually be tampered with in five different ways:

1. deletion of the whole audit trail;
2. deletion of N records in the middle of the audit trail;
3. deletion of N records from the end of the audit trail;
4. addition of invalid records to the audit trail; or
5. modification of one or more records in the audit trail.

The present invention can successfully and efficiently deal with all the above-listed possible ways of tampering. For example, since the data for the first record is stored in the Secure Store, and the DBA doesn't have access to it, therefore he can not replace the whole audit trail with an invalid one without being detected.

Assuming for the purpose of illustration that the DBA deletes N records $R_{i+1}$ to $R_{i+N}$, thus the last validatable record is record $R_i$. The next record should have authentication token and validation token calculated as follows according to one example of the present invention:

$$\text{Validation Token} = V_{i+1} = H \ (V_i + E_{Ai+1}\{D_{i+1}\})$$

However, the next validation token found in the SS 22 is not $V_{i+1}$, but $V_{i+N+1}$ originally for record $R_{i+N+1}$, where $$V = H \ (V_{i+N-1} + E_{Ai+N-1}\{D_{i+N-1}\})$$

Assuming the cryptography technology used in the encryption process is strong enough, (e.g., if a hash function having good security property is chosen, the probability of V being the same as $V_{i+1}$ is negligible), $V_{i+N+1}$ should be different from $V_{i+1}$ and a mismatch should almost always be detected.

Assuming that the DBA deletes N records from the end of the trail (e.g., from $R_{i-N}$ to $R_i$ wherein $R_i$ being the last record listed in the audit trail). This action, whether authorized or not, can be detected. The validation token generated at the end of the trail is now:

$$V_{i-N} = H(V_{i-N-1} + E_{Ai-N-1}\{D_{i-N-1}\}).$$

However the token in the SS 22 is $$V_i = H \ (V_{i-1} + E_{Ai}\{D_i\})$$

It is highly probable that these two validation tokens will differ which indicates that a modification of the trail has happened.

Moreover, it is desirable to detect any addition of the records to the audit trail by the DBA. For example, since the validation token for a record $R_i$ is generated in one example of the present invention by the following mechanism:

$$V_i = H \ (V_{i-1} + E_{Ai}\{D_i\})$$

and as the DBA doesn't have access to $A_i$ he cannot generate a valid validation token for the new record added by him. Any additions can be detected immediately.

Similarly, for modification of the record listed in the trail, since the DBA doesn't have access to any authentication token, he cannot generate a valid validation token for a record modified by him. Consequently, any modification can also be detected.

In the above-described examples of the present invention, it is assumed that the writer is a secure writing machine which has a secure storage not accessible by any user other than the auditor who may have a reading access. At a very minimum, even when an event happens that breaks the security, it is guaranteed that all records written before the event will be protected from tampering. This is because the writer private key for earlier records are not available to the attacker and therefore validation tokens for them cannot be generated without solving discrete logarithm problem.

Figure 2:
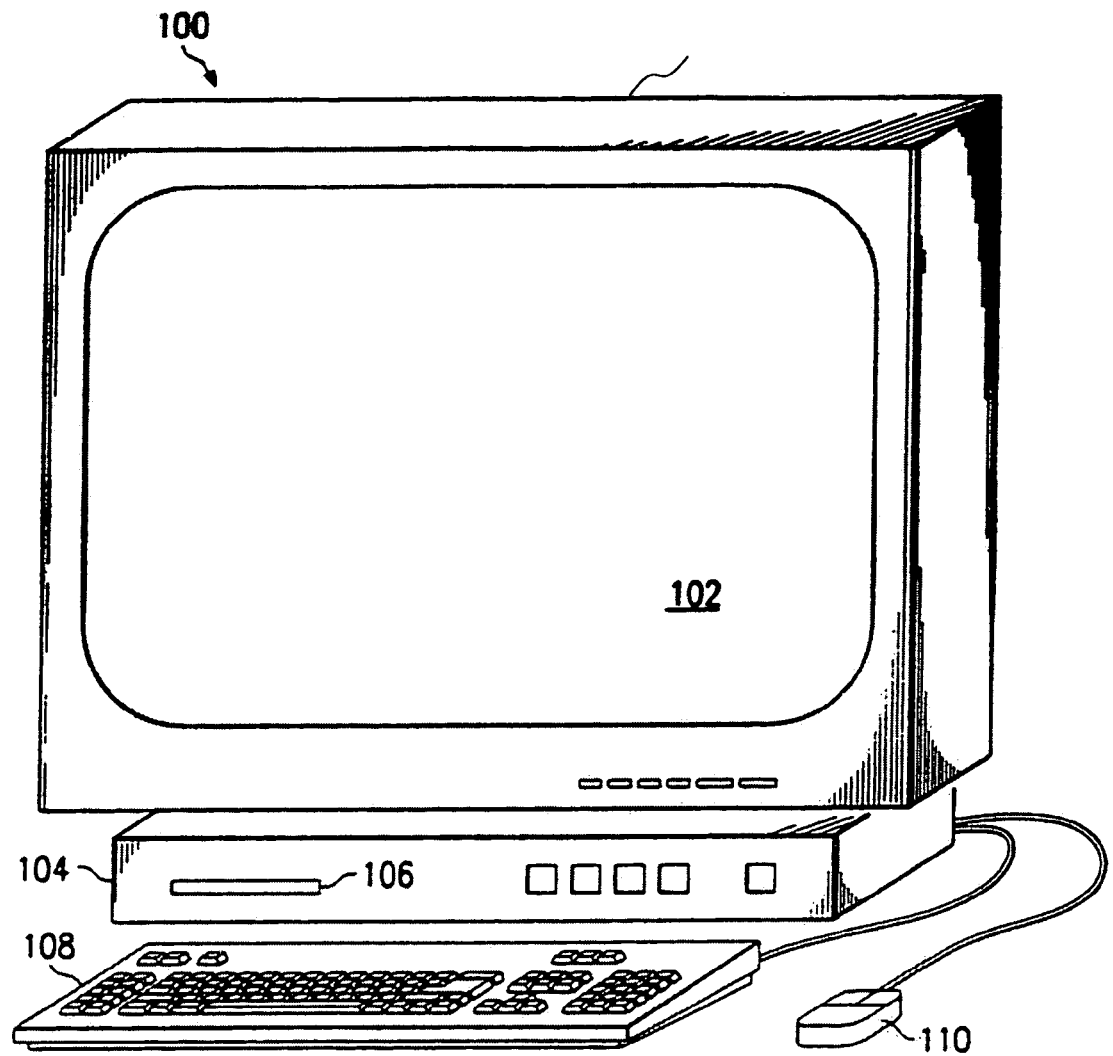
FIG. 2 illustrates a computer system for implementing the present invention.

It will also be understood by those having skill in the art that one or more (including all) of the elements/steps of the present invention may be implemented using software executed on a general purpose computer system or networked computer systems, using special purpose hardware-based computer systems, or using combinations of special purpose hardware and software. Referring now to FIG. 2, a typical computer system 100 includes a two-dimensional graphical display (also referred to as a "screen") 102 and a central processing unit 104. The central processing unit 104 contains a microprocessor and random access memory for storing programs. A disk drive 106 for loading programs may also be provided. A keyboard 108 having a plurality of keys thereon is connected to the central processing unit 104, and a pointing device such as a mouse 110 is also connected to the central processing unit 104.

The present invention, as described above, provides an improved method for providing a tamper-proof storage of an audit trail in a database. Various benefits are achieved over conventional approaches. For instance, the security of the entire database is strengthened, while normal database queries are not hindered. Further, any actions taken against the records in the audit trail can be detected without involving a computationally expensive process. It also accommodates the need to implement the "four eyes principle."

The above disclosure provides many different embodiments, or examples, for implementing different features of the invention. Specific examples of means, and processes are described to help clarify the invention. These are, of course, merely examples and are not intended to limit the invention from that described in the claims. For example, various acceptable encryption algorithms can be conceivably used in conjunction with various examples of the present invention. Similarly, hashing algorithms can also be varied by one skilled in the art.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for providing one or more independent auditors an audit trail having one or more records for a database system, an integrity of the audit trail being vulnerable to actions taken by an access-privileged user other than the auditors, the database system having a writing machine (writer) not under the control of the access-privileged user or the auditors, each record having a corresponding authentication token and a validation token, the method comprising:

initiating the audit trail by generating an initial value of an authentication token and an initial value of a validation token based on a first encryption key of a first type (writer public key) generated by the writer and a second encryption key of the first type generated by each Auditor (auditor public key);

generating a third encryption key of a second type (writer private key) related to the first encryption key and a fourth encryption key of a second type (auditor private key) related to the second encryption key;

updating the values of the writer private key, the authentication token, and the validation token for each additional audit trail record and integrating the updated values of the validation token and the writer public key into each corresponding record of the audit trail; and validating, by the auditor, each record of the audit trail by comparing the integrated validation token with a newly computed validation token in order to detect a tampering of the audit trail.

2. The method of claim 1 wherein the step of initiating further includes storing the initial values of the validation token and the writer public key in an initial record of the audit trail.

3. The method of claim 1 wherein the step of initiating further includes:

concatenating a predetermined identity for the audit trail, and a common initialization encryption key generated by the auditor with the auditor public key and the writer public key;

generating the initial value of the validation token through at least one hashing process and at least one encryption process using the concatenated result, wherein the initial value of the authentication token is used as an encryption key for the encryption process.

4. The method of claim 1 wherein the step of generating further includes:

storing the auditor private key in a first secured storage accessible only by the auditor; and storing the writer private key in a second secured storage accessible only by the writer.

5. The method of claim 1 wherein the step of updating further includes:

updating the value of the writer private key;

updating the value of the writer public key based on the updated writer private key;

updating the value of the authentication token by a hashing process based on the updated value of the writer private key and the auditor public key; and updating the value of the validation token through at least a hashing process and an encryption process, wherein the updated authentication token is used as an encryption key for the encryption process while updating the value of the validation token.

6. The method of claim 1 wherein the newly computed validation token is generated by the auditor based on the auditor private key and the writer public key.

7. A method for providing at least one independent auditor an audit trail, the audit trail having one or more records recording actions taken against a database system, the integrity of the audit trail being vulnerable to actions taken by an access-privileged user other than the auditor, the database system having a writing machine (writer) not under the control of the access-privileged user or the auditor, the method comprising:

integrating into each record a corresponding value of a validation token generated based on a first pair of public-private encryption keys generated by the writer and a second pair of public-private encryption keys generated by the auditor, wherein the writer has an access to the public encryption key of the second pair (auditor public key), and the auditor has an access to the public encryption key of the first pair (writer public key), wherein only the writer has an access to the private key of the first pair (writer private key), and only the auditor has an access to the private key of the second pair (auditor private key), and wherein the auditor has the ability to compute the values of the validation token for the records to verify against the integrated values of the validation token in order to detect a tampering of the audit trail by the access-privileged user.

8. The method of claim 7 wherein the step of integrating further includes:

initiating the audit trail by generating an initial value of the authentication token and an initial value of the validation token for an initial record of the audit trail based on the writer public key and the auditor public key; and updating the values of the writer private key, the authentication token, and the validation token, wherein each updated value of the validation token is integrated into a corresponding record of the audit trail.

9. The method of claim 8 wherein the step of initiating further includes:
concatenating a predetermined identity for the audit trail, and a common initialization encryption key generated by the auditor with the auditor public key and the writer public key; and
generating the initial value of the validation token through at least one hashing process and at least one encryption process using the concatenated result,
wherein the initial value of the authentication token is used as an encryption key for the encryption process.

10. The method of claim 9 wherein the step of initiating further includes:
storing the auditor private key, the identity for the audit trail, and the initial record in a designated secured information storage accessible only by the auditor,
wherein the stored auditor private key, the identity for the audit trail, and the initial record can be retrieved by the auditor and used with the writer public key accessible by the auditor to compute the values of the validation token for the records to verify against the integrated values of the validation token.

11. The method of claim 8 wherein the step of updating further includes:
updating the value of the writer private key through a hashing process;
updating the value of the writer public key based on the updated writer private key;
updating the value of the authentication token by a hashing process based on the updated value of the writer private key; and
updating the value of the validation token through at least a hashing process and an encryption process,
wherein the updated authentication token is used as an encryption key for the encryption process while updating the value of the validation token.

12. A computer readable medium storing a computer program for providing at least one independent auditor an audit trail, the audit trail having one or more records recording actions taken against a database system, the integrity of the audit trail being vulnerable to actions taken by an access-privileged user other than the auditor, the database system having a writing machine (writer) not under the control of the access-privileged user or the auditor, the computer program comprising instructions for:
integrating into each record a corresponding value of a validation token generated based on a first pair of public-private encryption keys generated by the writer and a second pair of public-private encryption keys generated by the auditor,
wherein the writer has an access to the public encryption key of the second pair (auditor public key), and the auditor has an access to the public encryption key of the first pair (writer public key),
wherein only the writer has an access to the private key of the first pair (writer private key), and only the auditor has an access to the private key of the second pair (auditor private key), and
wherein the auditor has the ability to compute the values of the validation token for the records to verify against the integrated values of the validation token in order to detect a tampering of the audit trail by the access-privileged user.

13. The computer readable medium storing the computer program of claim 12 wherein the means for integrating further includes instructions for: initiating the audit trail by generating an initial value of the authentication token and an initial value of the validation token for an initial record of the audit trail based on the writer public key and the auditor public key; and
updating the values of the writer private key, the authentication token, and the validation token,
wherein each updated value of the validation token is integrated into a corresponding record of the audit trail.

14. The computer readable medium storing the computer program of claim 13 wherein the means for initiating further includes instructions for:
concatenating a predetermined identity for the audit trail, and a common initialization encryption key generated by the auditor with the auditor public key and the writer public key; and
generating the initial value of the validation token through at least one hashing process and at least one encryption process using the concatenated result,
wherein the initial value of the authentication token is used as an encryption key for the encryption process.

15. The computer readable medium storing the computer program of claim 14 wherein the means for initiating further includes instructions for:
storing the auditor private key, the identity for the audit trail, and the initial record in a designated secured information storage accessible only by the auditor,
wherein the auditor private key, the identity for the audit trail, and the initial record can be retrieved by the auditor and used with the writer public key accessible by the auditor to compute the values of the validation token for the records to verify against the integrated values of the validation token.

16. The computer readable medium storing the computer program of claim 13 wherein the means for updating further includes instructions for:
updating the value of the writer private key through a hashing process;
updating the value of the writer public key based on the updated writer private key;
updating the value of the authentication token by a hashing process based on the updated value of the writer private key; and
updating the value of the validation token through at least a hashing process and an encryption process,
wherein the updated authentication token is used as an encryption key for the encryption process while updating the value of the validation token.

17. A system for providing at least one independent auditor an audit trail, the audit trail having one or more records recording actions taken against a database, the integrity of the audit trail being vulnerable to actions taken by an access-privileged user other than the auditor, the database having a writing machine (writer) not under the control of the access-privileged user or the auditor, the system comprising:
means for integrating into each record a corresponding value of a validation token generated based on a first pair of public-private encryption keys generated by the writer and a second pair of public-private encryption keys generated by the auditor,
means for the writer to have access to the public encryption key of the second pair (auditor public key), and the auditor has an access to the public encryption key of the first pair (writer public key), wherein only the writer has an access to the private key of the first pair (writer private key), and only the auditor has an access to the private key of the second pair (auditor private key), and means for the auditor to be able to compute the values of the validation token for the records to verify against the integrated values of the validation token in order to detect a tampering of the audit trail by the access-privileged user.

18. The system of claim 17 wherein the means for integrating further includes means for:

initiating the audit trail by generating an initial value of the authentication token and an initial value of the validation token for an initial record of the audit trail based on the writer public key and the auditor public key; and updating the values of the writer private key, the authentication token, and the validation token, wherein each updated value of the validation token is integrated into a corresponding record of the audit trail.

19. The system of claim 18 wherein the means for initiating further includes means for:

concatenating a predetermined identity for the audit trail, and a common initialization encryption key generated by the auditor with the auditor public key and the writer public key; and generating the initial value of the validation token through at least one hashing process and at least one encryption process using the concatenated result, wherein the initial value of the authentication token is used as an encryption key for the encryption process.

20. The system of claim 19 wherein the means for initiating further includes means for:

storing the auditor private key, the identity for the audit trail, and the initial record in a designated secured information storage accessible only by the auditor, wherein the stored auditor private key, the identity for the audit trail, and the initial record can be retrieved by the auditor and used with the writer public key accessible by the auditor to compute the values of the validation token for the records to verify against the integrated values of the validation token.

21. The system of claim 18 wherein the means for updating further includes means for:

updating the value of the writer private key through a hashing process;

updating the value of the writer public key based on the updated writer private key;

updating the value of the authentication token by a hashing process based on the updated value of the writer private key; and updating the value of the validation token through at least a hashing process and an encryption process, wherein the updated authentication token is used as an encryption key for the encryption process while updating the value of the validation token.

* * * * *